United States Patent
Logunov et al.

(10) Patent No.: US 12,053,839 B2
(45) Date of Patent: Aug. 6, 2024

(54) LASER WELDING MULTIPLE REFRACTIVE COATED TRANSPARENT SUBSTRATES

(71) Applicant: CORNING INCORPORATED, Corning, NY (US)

(72) Inventors: Stephan Lvovich Logunov, Corning, NY (US); Mark Alejandro Quesada, Horseheads, NY (US); Alexander Mikhailovich Streltsov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 597 days.

(21) Appl. No.: 17/056,963

(22) PCT Filed: May 21, 2019

(86) PCT No.: PCT/US2019/033291
§ 371 (c)(1),
(2) Date: Nov. 19, 2020

(87) PCT Pub. No.: WO2019/226637
PCT Pub. Date: Nov. 28, 2019

(65) Prior Publication Data
US 2021/0197316 A1    Jul. 1, 2021

Related U.S. Application Data

(60) Provisional application No. 62/675,089, filed on May 22, 2018.

(51) Int. Cl.
*B23K 26/211*    (2014.01)
*B23K 26/0622*    (2014.01)
(Continued)

(52) U.S. Cl.
CPC ........ *B23K 26/211* (2015.10); *B23K 26/0622* (2015.10); *B23K 26/18* (2013.01);
(Continued)

(58) Field of Classification Search
CPC .. B23K 1/005; B23K 26/211; B23K 26/0622; B23K 26/57; B23K 26/18;
(Continued)

(56) References Cited

U.S. PATENT DOCUMENTS

| 4,425,022 A | 1/1984 | Ludwig |
| 9,138,913 B2 * | 9/2015 | Arai ......................... B41M 5/26 |

(Continued)

FOREIGN PATENT DOCUMENTS

| CN | 1475325 A | 2/2004 |
| CN | 1591778 A | 3/2005 |

(Continued)

OTHER PUBLICATIONS

"Gas Laser", edited by Gas laser writing group, vol. 2, 2007, 9 pages. (2 pages of English translation and 7 pages of Original Document).

(Continued)

*Primary Examiner* — Nathaniel E Wiehe
*Assistant Examiner* — Spencer H. Kirkwood

(57) ABSTRACT

Disclosed herein are methods of bonding a multi-layer film to a substrate and resulting structures thereof. A method of laser bonding a multi-layer film to a substrate can include forming a film over a first surface of a first substrate that is transmissive to light at a first wavelength. The film may include a reflective layer that is reflective to light at the first wavelength and a refractive layer that is refractive to light at the first wavelength. The method may include irradiating a region of the film using laser radiation passing through the first substrate. A wavelength profile of the laser radiation can (Continued)

have a peak at about the first wavelength. The first wavelength can be between about 300 nm and about 5000 nm.

17 Claims, 11 Drawing Sheets

(51) Int. Cl.
  *B23K 26/12* (2014.01)
  *B23K 26/18* (2006.01)
  *B23K 26/57* (2014.01)
  *B23K 101/34* (2006.01)
  *B23K 103/16* (2006.01)
(52) U.S. Cl.
  CPC .......... *B23K 26/57* (2015.10); *B23K 26/1224* (2015.10); *B23K 2101/34* (2018.08); *B23K 2103/166* (2018.08)
(58) Field of Classification Search
  CPC ............ B23K 26/1224; B23K 2101/34; B23K 2103/166; B32B 17/06; B32B 9/00; C09K 11/08
  See application file for complete search history.

(56) References Cited

U.S. PATENT DOCUMENTS

| | | | |
|---|---|---|---|
| 9,515,286 | B2 | 12/2016 | Dabich et al. |
| 9,666,763 | B2 | 5/2017 | Logunov et al. |
| 2005/0048706 | A1 | 3/2005 | Shimomura et al. |
| 2006/0220183 | A1 | 10/2006 | Asai et al. |
| 2008/0024867 | A1 | 1/2008 | Kawashima et al. |
| 2011/0165816 | A1 | 7/2011 | Lee et al. |
| 2015/0079398 | A1 | 3/2015 | Amin et al. |
| 2017/0050881 | A1* | 2/2017 | Abdolvand ............ B23K 26/53 |
| 2019/0022782 | A1 | 1/2019 | Dejneka et al. |
| 2020/0238437 | A1 | 7/2020 | Logunov et al. |

FOREIGN PATENT DOCUMENTS

| | | | | |
|---|---|---|---|---|
| CN | 102185115 | A | | 9/2011 |
| CN | 103561937 | A | | 2/2014 |
| CN | 107073641 | A * | 8/2017 | ......... B23K 26/0006 |
| CN | 107949926 | A | | 4/2018 |
| CN | 107995883 | A | | 5/2018 |
| EP | 1882678 | A1 | | 1/2008 |
| JP | 2009-168986 | A | | 7/2009 |
| WO | 2012/140873 | A1 | | 10/2012 |
| WO | 2016/069822 | A1 | | 5/2016 |
| WO | 2017/040475 | A1 | | 3/2017 |
| WO | WO-2017040475 | A1 * | 3/2017 | ........... B23K 1/0056 |
| WO | 2017/161099 | A1 | | 9/2017 |

OTHER PUBLICATIONS

Chinese Patent Application No. 201980034686.7, Office Action dated Jun. 22, 2022, 5 pages (English Translation only), Chinese Patent Office.
International Search Report and Written Opinion of the International Searching Authority; PCT/US2019/033291; Mailed Aug. 20, 2019; 8 Pages; European Patent Office.
Chinese Patent Application No. 201980034686.7, Office Action, dated Feb. 23, 2023, 4 pages Chinese Patent Office.

* cited by examiner

LASER WELDING MULTIPLE REFRACTIVE COATED TRANSPARENT SUBSTRATES

INCORPORATION BY REFERENCE OF RELATED APPLICATIONS

This application claims the benefit of priority under 35 U.S.C. § 371 of International Application No. PCT/US2019/033291, filed on May 21, 2019, which claims the benefit under of U.S. Provisional Patent Application No. 62/675,089, filed May 22, 2018, and titled LASER WELDING COATED SUBSTRATES, the entire contents of which are incorporated herein by reference and made a part of this specification.

BACKGROUND

Field of the Disclosure

Some implementations of this disclosure relate to laser welding of substrates. Some examples herein more specifically discuss using coated substrates or films in laser welding.

Description of the Related Art

Although various materials and techniques for laser welding are known, there remains a need for improved laser welding, and associated materials, techniques, and resulting articles. Various examples of bonding practices include fusion bonding, anodic bonding of sodium rich glass to semiconductors, and adhesive bonding. Conventionally, glass-to-glass substrate bonds such as plate-to-plate sealing techniques can be performed with organic glues or inorganic glass frits. However, certain challenges remain in the development of these techniques.

SUMMARY

Certain example embodiments are summarized below for illustrative purposes. The embodiments are not limited to the specific implementations recited herein. Embodiments may include several novel features, no single one of which is solely responsible for its desirable attributes or which is essential to the embodiments.

Some aspects of this disclosure can relate to a method of laser bonding a multi-layer film to a substrate. The method can include forming a film over a first surface of a first substrate that is transmissive to light at a first wavelength. The film can include a reflective layer that is reflective to light at the first wavelength and a refractive layer that is refractive to light at the first wavelength. The method can include irradiating a region of the film using laser radiation passing through the first substrate. A wavelength profile of the laser radiation can have a peak at about the first wavelength. The first wavelength can be between about 300 nm and about 5000 nm.

Some aspects of this disclosure relate to a bonded structure, which can include a first material that transmits light at a first wavelength. The first material can have a first end, a second end, and a thickness measured between the first and second ends. Nanoparticles can be dispersed within a region of the first material near a second end of the first material. The nanoparticles can include first particles of a material that reflects light at the first wavelength and second particles of a material that refracts light at the first wavelength.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

DETAILED DESCRIPTION OF CERTAIN EMBODIMENTS

Figure 1:
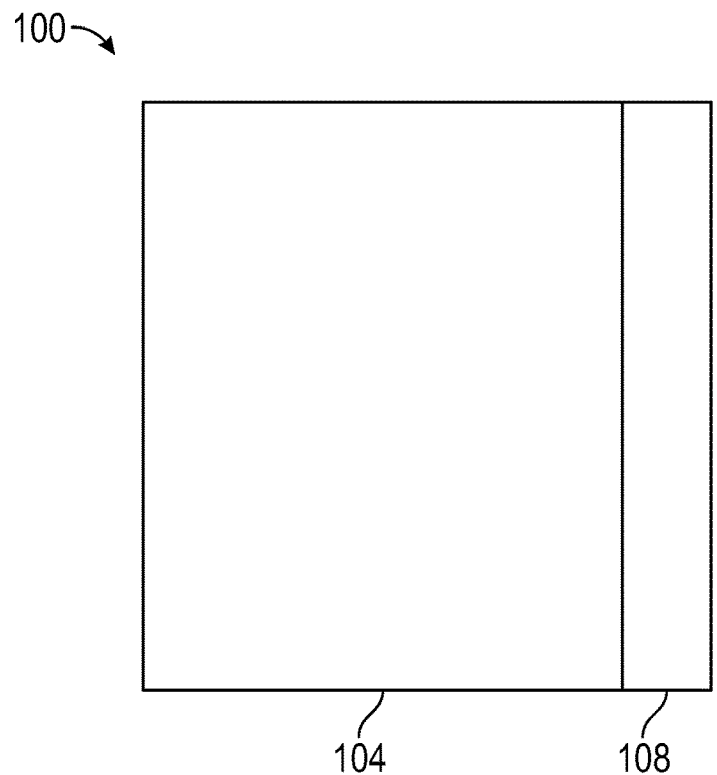
FIG. 1 shows a schematic of an example optical structure that may be used in bonding.

The present disclosure relates generally to hermetic barrier layers, and more particularly to methods and compositions used to seal solid structures. Substrate-to-substrate (e.g., glass-to-glass) bonding techniques can be used to sandwich a workpiece or film between adjacent substrates and generally provide a degree of encapsulation, in some cases.

Many modern devices benefit from hermetic environments to operate and many amongst these are "active" devices which can use electrical biasing. Hermetic barrier layers can be used to protect sensitive materials from deleterious exposure to a wide variety of liquids and gases. As used herein, "hermetic" can refer to a state of being completely or substantially sealed, especially against the escape or entry of water or air, though protection from exposure to other liquids and gases is contemplated.

Displays such as using organic light emitting diodes (OLED) that may use light transparency and biasing are demanding applications, and in some cases, it can be beneficial to use absolute hermeticity due to the use of electron-injection materials. Other structures, such as liquid lens structures, may also benefit from hermetic environments. These materials may decompose at atmosphere within seconds otherwise, so the respective device can maintain vacuum or inert atmospheres for long periods of time. Furthermore, the hermetic sealing can be performed near ambient temperatures due to high temperature sensitivity of the organic material to be encapsulated.

Glass-to-glass bonding techniques can be used to sandwich a workpiece or film between adjacent substrates and generally provide a degree of encapsulation. Various examples of current bonding practices include fusion bonding, anodic bonding of sodium rich glass to semiconductors and adhesive bonding. Conventionally, glass-to-glass substrate bonds such as plate-to-plate sealing techniques are performed with organic glues or inorganic glass frits. For example, some adhesives are specifically designed to bond glass to glass. While adhesive may be easy to apply, it can be very challenging to form a joint free of bubbles. Patterning adhesives to complete a bond line without squeezing out from between the surfaces being bonded and into a neighboring channel can also be challenging. Moreover, in certain cases, adhesives can be hazardous to other parts of a bonding process. Accordingly, device makers of systems using hermetic conditions for long-term operation often prefer inorganic metal, solder, or frit-based sealing materials because organic glues (polymeric or otherwise) form barriers that are generally permeable to water and oxygen at levels many orders of magnitude greater than the inorganic options. On the other hand, while inorganic metal, solder, or frit-based sealants can be used to form impermeable seals, the resulting sealing interface is generally opaque as a result of the metal cation composition, scattering from gas bubble formation, and distributed ceramic-phase constituents.

Frit-based sealants may be used, for instance, that include glass materials ground to a particle size ranging typically from about 2 to 150 microns. For frit-sealing applications, the glass frit material is typically mixed with a negative coefficient of thermal expansion (CTE) material having a similar particle size, and the resulting mixture is blended into a paste using an organic solvent or binder. Exemplary negative CTE inorganic fillers include cordierite particles (e.g. $Mg_2Al_3[AlSi_5O_{18}]$), barium silicates, β-eucryptite, zirconium vanadate ($ZrV_2O_7$), or zirconium tungstate, ($ZrW_2O_8$) and can be added to the glass frit, forming a paste, to lower the mismatch of thermal expansion coefficients between substrates and the glass frit. The solvents are used to adjust the rheological viscosity of the combined powders and organic binder paste and must be suitable for controlled dispensing purposes.

To join two substrates, a glass frit layer can be applied to sealing surfaces on one or both of the substrates by spin-coating or screen printing. The frit-coated substrate(s) can be initially subjected to an organic burn-out step at relatively low temperature (e.g., 250° C. for 30 minutes) to remove the organic vehicle. Two substrates to be joined can be then assembled/mated along respective sealing surfaces and the pair can be placed in a wafer bonder. A thermo-compressive cycle can be executed under well-defined temperature and pressure whereby the glass frit is melted to form a compact glass seal.

Glass frit materials, with the exception of certain lead-containing compositions, typically have a glass transition temperature greater than 450° C. and thus may require processing at elevated temperatures to form the barrier layer. Such a high-temperature sealing process can be detrimental to temperature-sensitive workpieces.

Further, the negative CTE inorganic fillers, which are used in order to lower the thermal expansion coefficient mismatch between typical substrates and the glass frit, can be incorporated into the bonding joint and result in a frit-based barrier layer that is substantially opaque. Based on the foregoing, it may be desirable to form glass-to-glass, glass-to-metal, glass-to-ceramic, and other seals at low temperatures that are transparent and hermetic.

While frit-based layers may be used, other materials may also be advantageous. For example, thin films may be used in connection with one or more substrates. It may be advantageous to create a multi-layer film that can be tuned to a particular (e.g., selected) wavelength (e.g., for laser welding). Additionally or alternatively, the film may advantageously be configured to absorb light in the visible and/or the infrared (e.g., near-infrared (NIR)) wavelength ranges. Traditionally, challenges have arisen in using a visible or infrared laser to bond a film to a substrate. For example, the energy output of the laser may be too low, the resulting temperature gain at the bonding region may not be high enough, or other problems may arise. However, frequently visible and infrared lasers are less expensive and more easily obtained. Accordingly, it may be advantageous to use films that can be tuned to absorb laser radiation from visible and/or infrared wavelengths.

A heating interface that can be used can be applied in various configurations. For example, in some implementations one of two glass substrates is absorbing and the other transmissive. In certain implementations, a frit layer can be disposed between two transparent glass substrates. Additionally or alternatively, a thin absorbing film can be placed at the interface between two transparent glasses. In each case, the substrates may be kept pressed together during welding. Because it can be challenging sometimes finding a film material with sufficiently high absorption at a given wavelength in the submicron thickness weld region, in many cases a UV laser can be used for laser welding (LW). Many materials have high absorption in the UV or are partially reflective materials such as metals. In the case of metals however, high reflection generally incurs inefficient utilization of the laser energy used in welding.

Thus, a multi-layer film (e.g., two-layer film) may be used, in some implementations. One of the layers may be reflective and the other refractive. This can form an anti-reflective (AR) function, which can localize the incident laser energy in an interfacial standing wave, thus making absorption on the surface highly efficient. This AR functionality can enhance the absorption of even weakly absorbing film materials, thus making laser wavelength selection based more on lowered manufacturing costs than make-or-break feasibility. In some cases, additional layers can be used.

Tuning the interfacial absorption LW-wavelength can be helpful for increasing efficient usage of the incident laser energy and/or improving the laser welding process economics by improving (e.g., optimizing) the film properties for particular and possibly more cost-effective laser wavelengths. IR or near-IR lasers are generally less expensive than UV or visible lasers. Thus, methods of providing sensible film selection choices by tuning the film's absorption to that near the cost-effective IR or near-IR laser wavelength region can be beneficial. However, many films have limited absorption at 1-2 um thicknesses. Although one could use a partially absorbing metal coating in this case, the film may still have significant reflectivity (e.g., at least 40-50%), making the welding process less effective or even ineffective. Additionally, reflected energy in such a case may be absorbed by parts of the welding device, thus damaging the device.

A combination of reflective films, such as a metal and/or a thin film dielectric—which may together provide anti-reflective properties—can be used. Combination of at least two films can tune the absorption to a maximum at the desired wavelength. Furthermore, the laser welding process may transform the thin metal film into nano-scale droplets, which may be below the Mie scattering threshold. The process can produce a transparent weld containing droplets dispersed amidst a dielectric and/or substrate element spatial distribution. If the coatings are selectively placed at the weld zone, the total package may be transmissive after the weld process.

Processes described herein can allow for tunable absorption characteristics of the film to the laser. Moreover, the processes can effectively enhance the absorption of even weakly absorbing film materials, while simultaneously protecting laser parts. High flexibility of the interface properties, particularly in terms of conductivity, melting/diffusion characteristics, and other properties, can be achieved. Moreover, these processes can make a broad range of film materials available for laser welding.

Turning now to the figures, some example features and advantages will be discussed. FIG. 1 shows a schematic view of an example optical structure 100 that may be used in bonding (e.g., hermetic sealing). The optical structure 100 can include a first substrate 104 and a film 108. The first substrate 104 can include an optically transmissive material. For example, glass, ceramic, glass-ceramic, and/or any other optically transmissive material may be used. The first material or substrate 104 can be sufficiently transmissive (e.g., at least for the wavelength of light used by the laser or the light energy used to perform the bonding) so that sufficient amounts of the laser light 120 can travel through the first material or substrate 104 and reach the film 108 to perform the bonding, as discussed herein. The degree of transmissivity of the first material or substrate 104 can depend on the laser or light energy that is used. For example, in some cases, a less transmissive first material or substrate 104 can be used if more light energy is used, whereas a more transmissive first material or substrate 104 can enable the bonding to be performed using less light energy. In some cases, using a large amount of light energy with a relatively low transmissive first material or substrate 104 could damage the first material or substrate 104. Therefore, the amount of transmissivity can depend on the properties (e.g., strength, melting point, etc.) of the material used for the first substrate 104. For example, the first material or substrate 104 can have about 95%, about 90%, about 80%, about 70%, about 60%, about 50%, about 40%, about 30%, about 25%, about 20%, or less transmissivity (e.g., at least for the wavelength of light 120 used for the bonding), or any ranges or values therein, although other values could also be used in some implementations.

Under certain conditions described herein, suitable glass substrates can exhibit significant induced absorption during sealing. In some implementations, the first substrate 104 can be a transparent glass plate like those manufactured and marketed by Corning Incorporated under the brand names of Eagle 2000® or other glass. Alternatively, the first substrate 302 can be any transparent glass plate such as those manufactured and marketed by Asahi Glass Co. (e.g., AN100 glass), Nippon Electric Glass Co., (e.g., OA-10 glass or OA-21 glass), or Corning Precision Materials. Exemplary glass substrates can have a coefficient of thermal expansion of less than about $150\times10^{-7}/°$ C., e.g., less than $50\times10^{-7}$, $20\times10^{-7}$ or $10\times10^{-7}/°$ C., or any values therebetween, or any ranges bounded by these value, although other materials can be used as well. The substrate may include BK-7 glass, oxide glass, and/or other glasses, and/or ceramics.

The film 108 can include one or more layers, as described herein. The film 108 can be configured to increase an absorption of energy of the optical structure 100, such as from laser radiation. The film 108 may be coated on or otherwise formed over the first substrate 104. For example, the film 108 can be deposited on the first substrate 104 under vacuum. In some designs, the film 108 is adhered to the first substrate 104. The film 108 can include a low melting glass (LMG) or ultraviolet absorbing (UVA) film material or NIR absorbing (IRA) film material. The film 108 can include an inorganic material (e.g., metal) and may be referred to as an inorganic film.

A strong, hermetic, transparent bond may be achieved using implementations of the present disclosure by an exemplary low melting film or another film that absorbs/melts at an incident wavelength. Although various embodiments, are disclosed in connection with hermetic bonds or seals, in some cases, the bond is not hermetically sealed. With regard to the low melting glass absorption event, laser illumination of the glass-LMG/UVA-glass structure with sufficiently high power per unit area can initiate absorption in the sputtered thin film LMG/UVA interface, inducing melting. The melting point of the LMG/UVA film can be, but is not limited to, about 450° C., but the interfacial temperature can be higher.

Heretofore, a low-power laser-welding process has been described that relies on an absorbing low melting glass interfacial film and can be attributed to diffusion welding, owing to its low temperature bond formation (e.g., in some cases at half the melting temperature), and requirement for contact and pressure conditions. As discussed above, several effects were notable to laser welding glass sheets together with strong bond formation, e.g., an absorbing low melting glass film at the incident laser wavelength, laser induced color centers formed in the glass substrates, and thermal induced absorption in the substrate to effectively accelerate the temperature increase.

In some implementations, the film 108 includes an inorganic film that is transmissive at wavelengths between about 193 nm to 5000 nm, between about 420 nm to 780 nm, or in some implementations between about 300 nm to about 1000 nm. Absorption of the inorganic film at a selected wavelength may be more than 10%. The composition of the inorganic film can be, but is not limited to, $SnO_2$, ZnO, $TiO_2$, ITO, Zn, Ti, Ce, Cu, Pb, Fe, Va, Cr, Mn, Mg, Ge, $SnF_2$, $ZnF_2$, or any combination thereof. The composition of the inorganic film can be selected to lower the activation energy for inducing creep flow of the first substrate 104. The composition of the inorganic film may be a laser absorbing low liquidus temperature material with a liquidus temperature less than or equal to about 1000° C., less than or equal to about 600° C., and/or less than or equal to about 400° C., or values or ranges therebetween. A bond created between the first substrate 104 and the film 108 may have an integrated bond strength greater than an integrated bond strength of a residual stress field in the first substrate 104 alone. For example, in some implementations the bond will fail only by cohesive failure. In some implementations, the composition of the inorganic film comprises 20-100 mol % SnO, 0-50 mol % $SnF_2$, and 0-30 mol % $P_2O_5$ or $B_2O_3$. In some implementations, the film 108 and the first substrate 104 have a combined internal transmission of more than 80% at a selected wavelength disclosed herein.

In some implementations, a thickness of the film 108 can be between about 10 nm to 100 micrometers (microns). In some implementations, the first substrate 104 and/or the film 108 can include an alkaline earth boro-aluminosilicate glass, thermally strengthened glass, chemically strengthened glass, boro-silicate glass, alkali-aluminosilicate glass, soda-lime glass, and combinations thereof. In other implementations, the inorganic film, first substrate, or second substrate can be optically transparent before and/or after the step of bonding in a range of greater than 80%, between 80% to 90%, greater than 85%, or greater than 90% at the selected wavelength.

Figure 2A:
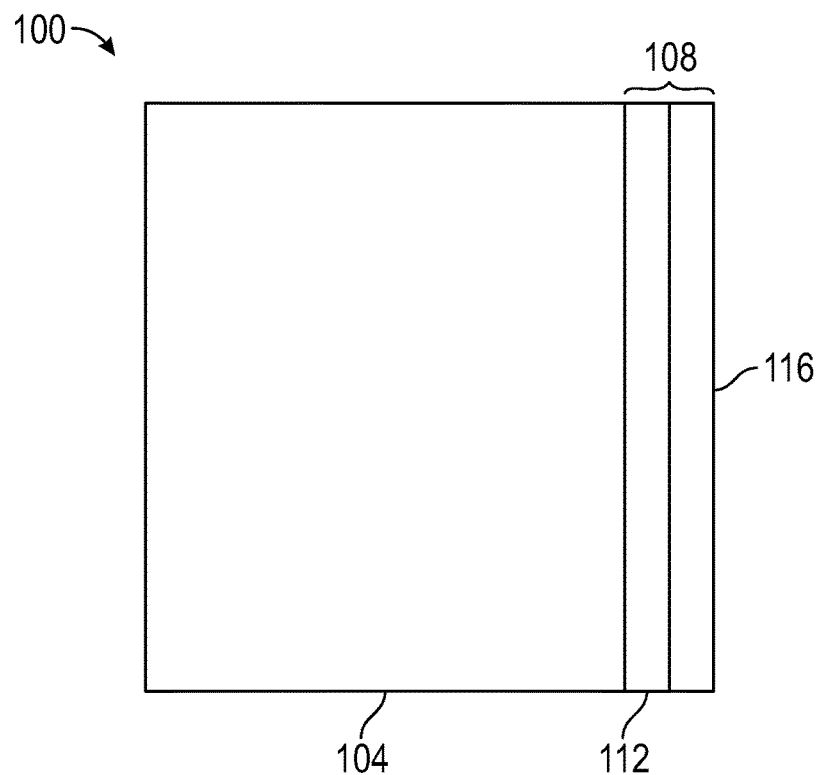
FIG. 2A shows an example optical structure that has a multi-layer film.

FIG. 2A shows an example optical structure 100 that has a multi-layer film 108. As shown, the film 108 can have a refractive layer 112 and a reflective layer 116. The film 108 may have a thickness of less than 10 microns. In some implementations, the thickness is less than 5 microns, less than 3 microns, less than 1 microns, less than 0.5 microns, or be between any of these values or fall within a range formed from any of these values. The film 108 can be configured to absorb a greater proportion of laser radiation than the reflective layer 116 alone, at a particular wavelength.

The reflective layer 116 can include one or more materials. For example, the reflective layer 116 can include any material configured to reflect light at a particular wavelength. For example, SnO2, ZnO, TiO, ITO, Zn, Ti, Ce, Pb, Fe, Va, Cr, Cu, Mn, Mg, Ge, SnF2, ZnF2, and/or a combination thereof may be used. Other materials are also possible.

The reflective layer 116 can be configured to reflect light at a particular wavelength. For example, a composition of the film 108 may be configured to reduce reflection of laser radiation at a particular wavelength relative to the reflective layer 116 alone. The reflective layer 116 can have various thicknesses. For example, the reflective layer 116 can have a thickness of 10 nm, 20 nm, 30 nm, 40 nm, 50 nm, 75 nm, 100 nm, 125 nm, 150 nm, 175 nm, 200 nm, 300 nm, 400 nm, 500 nm, 600 nm, 700 nm, 800 nm, 900 nm, 1000 nm, any thickness within those values, or fall within any range formed from those values. The thickness may be less than a micron in some implementations, although other sizes could be used in some cases.

The refractive layer 112 can be configured to improve various characteristics of the film 108 relative to a film consisting only of the reflective layer 116. For example, the refractive layer can have an index of refraction of greater than 1.2 at a particular wavelength. The index of refraction may be greater than 1.3, 1.4, 1.5, 1.6, 1.7, 1.8, 1.9, or 2.0 in certain implementations. The refractive layer 112 can include a plurality of materials therein and/or plurality of associated different indices of refraction, as discussed herein. Each material may have an index of refraction disclosed herein. The refractive layer 112 can have a thickness of 10 nm, 20 nm, 30 nm, 40 nm, 50 nm, 75 nm, 100 nm, 125 nm, 150 nm, 175 nm, 200 nm, 300 nm, 400 nm, 500 nm, 600 nm, 700 nm, 800 nm, 900 nm, 1000 nm, any thickness within those values, or fall within any range formed from those values. The thickness may be less than a micron in some implementations.

The film 108, as a combination of the refractive layer 112 and the reflective layer 116 can be configured to absorb more than 50%, more than 60%, more than 70%, more than 75%, more than 80%, more than 85%, more than 90%, more than 95%, and in some implementations more than 99% of the laser radiation at a particular wavelength. In some implementations, the film 108 is configured to reflect less than 50%, less than 40%, less than 30%, less than 25%, less than 20%, less than 15%, less than 10%, less than 5%, and in some implementations less than 1% of the laser radiation at a particular wavelength.

The combination of features of the refractive layer 112 and the reflective layer 116 (e.g., widths, materials, etc.) can be tuned for a particular wavelength of laser radiation. The film 108 can be configured to cause a rate of temperature increase from the laser radiation at a particular wavelength of greater than 50% relative to a rate obtainable by the reflective layer 116 alone. The methods described herein can be used to prepare an absorbing film stack for a more efficient laser welding process. Because some materials, including metals, have relatively low reflectivity by optical standards (e.g., between about 50% and about 70%), this can result in effectively wasting about 50%-70% of the incident laser energy. Moreover, as noted above, reflected laser light could damage sensitive materials around welding zone due to its absorption. One or more additional layers on top of the inorganic material layer (e.g., metal) can be used to reduce reflectivity and/or increase absorption.

With continued reference to FIG. 2A, the refractive layer 112 can be disposed between the first substrate 104 and the reflective layer 116. Other variants are possible. The refractive layer 112 can serve as an anti-reflective (AR) coating.

Figure 2B:
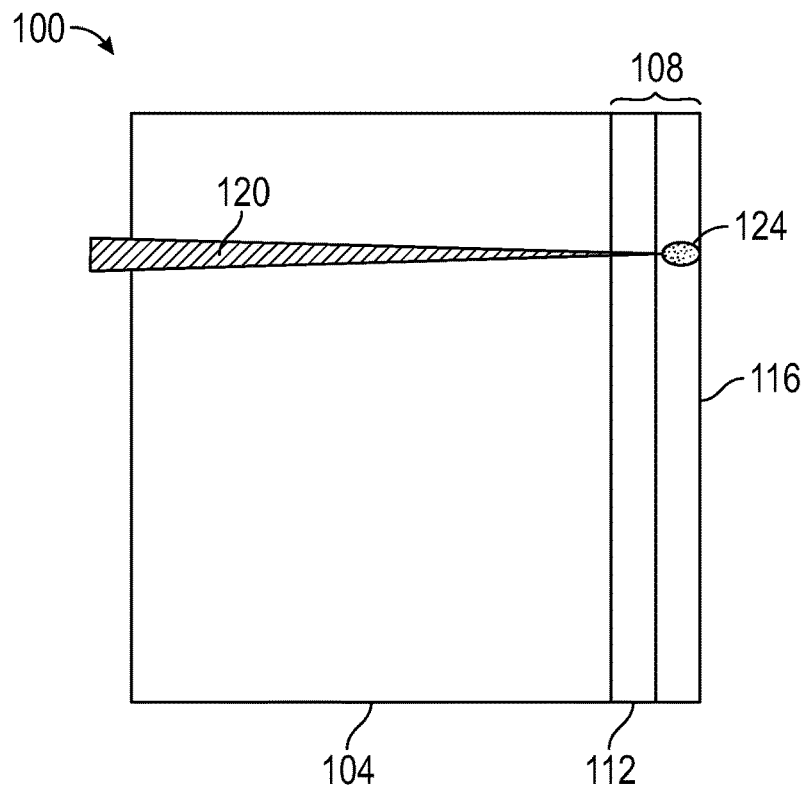
FIG. 2B shows laser radiation bonding a bonding region of the reflective layer.

FIG. 2B shows laser radiation 120 bonding a bonding region 124 of the reflective layer 116. The laser radiation 120 can be configured to pass through the first substrate 104 before passing through the refractive layer 112 and/or being incident on the reflective layer 116. The bonding region 124 can have a diameter (e.g., width as measured perpendicular to an optical axis of the laser radiation 120) of 10 microns, 20 microns, 30 microns, 40 microns, 50 microns, 60 microns, 70 microns, 80 microns, 90 microns, 100 microns, 150 microns, 200 microns, 300 microns, 400 microns, 500 microns, 750 microns, 1000 microns, any value therebetween, or fall within any range between any of those values.

The laser radiation 120 may come from a laser having a pulse width or a continuous wave emission. In appropriate implementations, the pulse width may be from 1 to 40 nanoseconds and/or a repetition rate of the laser may be at least 1 kHz. The bonding region 124 may be translated in any axis throughout the optical structure 100. The optical structure 100 and/or the laser may be translated. The bonding region 124 formed by the laser radiation can be translated at a speed of between about 1 mm/s and about 1000 mm/s. This speed, in some implementations, does not exceed the product of a diameter (e.g., width) of the bonding region 124 and a repetition rate of the laser radiation. The bonding can create a bond line having a width of between about 20 µm and about 1000 µm, or any values or ranges therein.

Figure 2C:
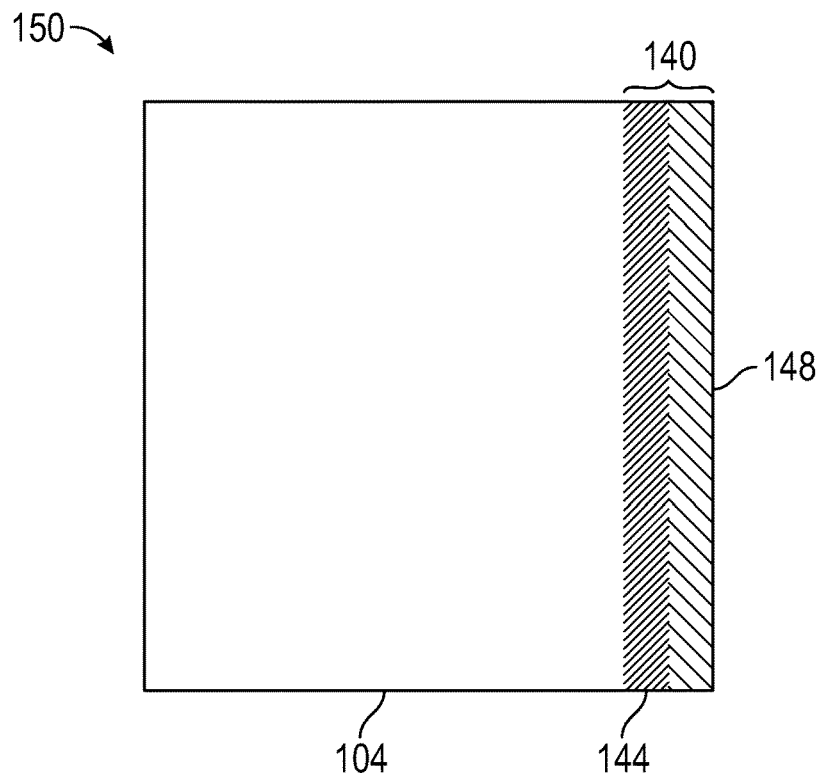
FIG. 2C shows schematically how portions of the film 108 may look after having been laser welded into a bonded structure.

The resulting bonding region 124 of a bonded structure 150 can be transparent to one or more wavelengths. FIG. 2C shows schematically how portions of the film 108 may look after having been laser welded into a bonded structure 150. The resulting dispersed particles 140 of the bonded structure 150 may be transparent. A region of modified material may result. The region may include a plurality of elements or particles interspersed within an interface. The region may include a first region of refractive particles 144 that may result from the film refractive layer 112 and/or a second region of reflective particles 148 that may result from the reflective layer 116. The region of refractive particles 144 may include other particles (e.g., reflective particles 148), but such particles may be at a lower concentration or number than a corresponding concentration or number of refractive particles 144. Additionally or alternatively, the region of reflective particles 148 may include other particles (e.g., refractive particles 144), but such particles may be at a lower concentration or number than a corresponding concentration or number of reflective particles 148. The refractive particles 144 may be generally disposed between the first substrate 104 and the reflective particles 148. Attributes of one or both of the refractive particles 144 and/or the reflective particles 148 may be shared by the underlying refractive layer 112 and/or reflective layer 116, as described herein. In some cases, the reflective particles 148 (which can sometimes be referred to as first particles) can be sized (e.g., sufficiently small) so that they do not reflect light, even though the type of material of the first (e.g., reflective) particles 148 does reflect light, in bulk. In some cases, the refractive particles 144 (which can sometimes be referred to as second particles) can be sized (e.g., sufficiently small) so that they do not refract light, even though the type of material of the second (e.g., refractive) particles 144 does refract light, in bulk.

Figure 3A:
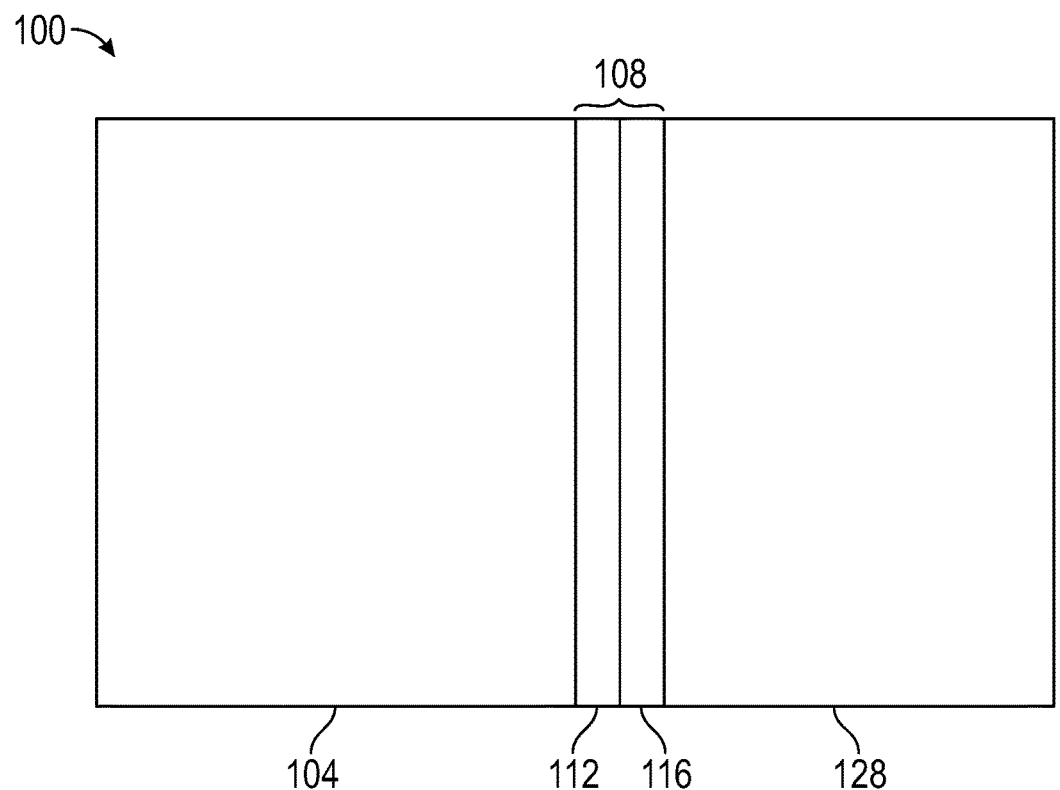
FIG. 3A shows an example of how a second substrate may be disposed within the optical structure.

In some implementations, a second substrate 128 may be included. For example, some optical elements may benefit from a transparent bond between two substrates (e.g., glass, glass-ceramic, or ceramic). FIG. 3A shows an example of how a second substrate 128 may be disposed within the optical structure 100. The second substrate 128 may be disposed on and/or adjacent to the reflective layer 116. In some implementations, the second substrate 128 is the first substrate 104 and the first substrate 104 is the second substrate 128 (e.g., the positions of the substrates may be reversed). The reflective layer 116 may be adhered and/or formed (e.g., deposited) on the second substrate 128. The second substrate 128 can be the same glass material as the first substrate 104, and/or the second substrate 128 can be a non-transparent substrate such as, but not limited to, a ceramic substrate or a metal substrate. The first substrate 104 can be a ceramic, ITO, metal or other material substrate, patterned or continuous. The second substrate 128 can be the same material as the substrate 104, or it can be a different material. The second material or substrate 128 can be transmissive (e.g., similar to the first material or substrate 104), or opaque, in some implementations.

Figure 3B:
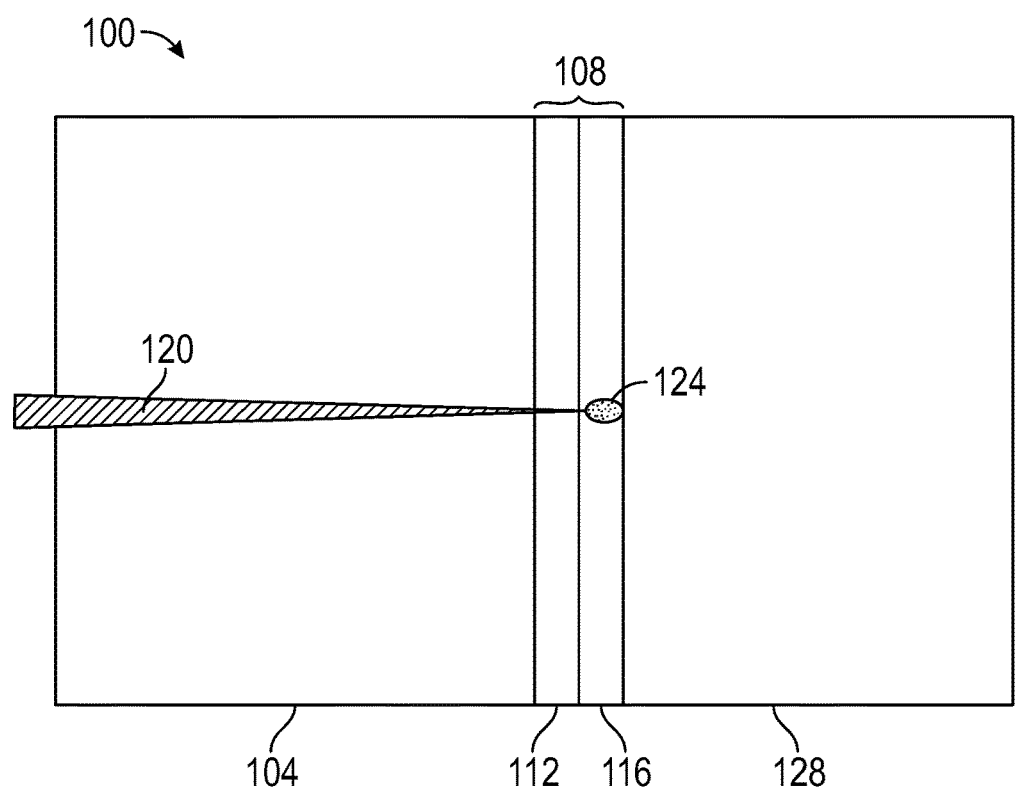
FIG. 3B shows how the laser radiation may be used to bond the optical structure at the bonding region.
Figure 3C:
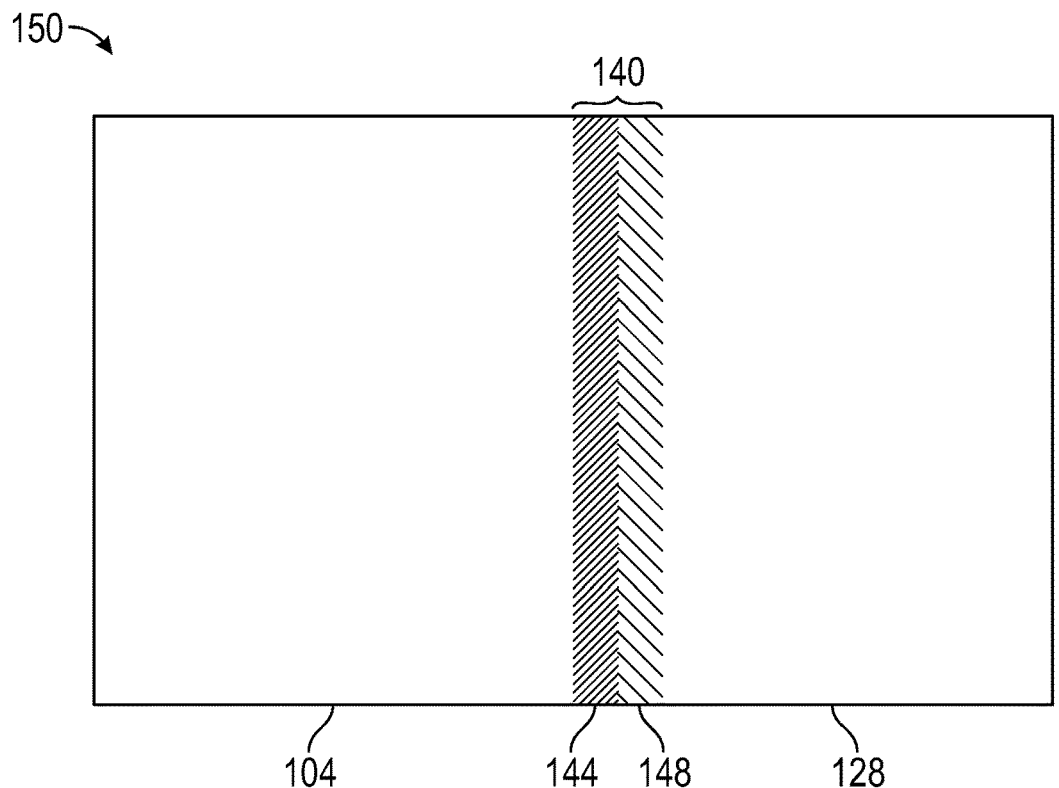
FIG. 3C shows an example bonded structure after the optical structure has been laser welded along the film.

The second substrate 128 can include glass, ceramic, glass-ceramic, metal, or some other substrate. FIG. 3B shows how the laser radiation 120 may be used to bond the optical structure 100 at the bonding region 124. FIG. 3C shows an example bonded structure 150 after the optical structure 100 has been laser welded along the film 108. The resulting dispersed particles 140 can be disposed between the first substrate 104 and the second substrate 128. The reflective particles 148 may be generally nearer the second substrate 128 than are the refractive particles 144. Additionally or alternatively, the refractive particles 144 may be disposed generally between the first substrate 104 and the reflective particles 148. In some implementations, the reflective layer 116 can be omitted, and the second substrate 128 can be the reflective material. The reflective layer 116 can be the same material as the second substrate 128, and in some cases, they can be integrally formed. The dispersed particles 140 can migrate into the surrounding materials. The thickness of the region with the dispersed particles 140 can be greater than the thickness of the film 108, such as by about 5%, about 10%, about 15%, about 20%, about 25%, about 30%, about 35%, about 40%, about 50%, about 60%, about 70%, about 80%, about 90%, about 100% (e.g., twice as thick), about 120%, about 140%, about 160%, about 180%, about 200%, or more, or any values or ranges therebetween, although other configurations are also possible. The region with the dispersed particles 140 can have a thickness that is about 1%, about 2%, about 3%, about 4%, about 5%, about 6%, about 7%, about 8%, about 9%, about 10%, about 12%, about 15%, about 20%, about 25%, about 30%, about 40%, about 50%, or more of the thickness of the first material 104 and/or of the second material 128, or any ranges or values therein. The region with the dispersed particles 140 can have a thickness of about 20 nm, about 40 nm, about 60 nm, about 80 nm, about 100 nm, about 125 nm, about 150 nm, about 175 nm, about 200 nm, about 300 nm, about 400 nm, about 500 nm, about 600 nm, about 700 nm, about 800 nm, about 900 nm, about 1 micron, about 1.25 microns, about 1.5 microns, about 1.75 microns, about 2 microns, about 2.5 microns, about 3 microns, about 4 microns, about 5 microns, about 7 microns, about 10 microns, about 15 microns, about 20 microns, about 25 microns, about 30 microns, about 40 microns, about 50 microns, or more, or any values or ranges therein, although other configurations are possible. The region with the dispersed particles 140 can be near the end of the first material 104 that is nearer to the second material 128 and/or that was nearer to the film 108. The region with the dispersed particles 140 can be near the end of the second material 128 that is nearer to the first material 104 and/or that was nearer to the film 108. The dispersed particles can extend into the first material 104 by a distance which can depend on the energy applied and the types of materials, for example. Accordingly, the size of the region near the corresponding end(s) of the first material 104 and/or the second material 128 can depend on the materials used and the amount or type of energy applied.

Figure 3D:
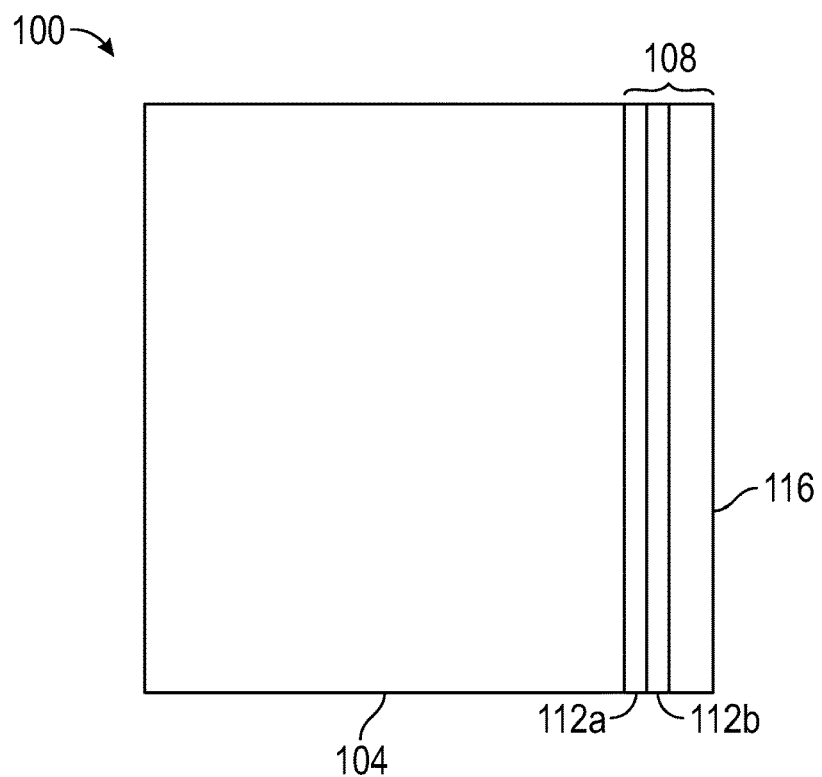
FIG. 3D shows another example optical structure that includes a multi-layer refractive layer.

FIG. 3D shows another example optical structure 100 that includes a multi-layer refractive layer 112. The refractive layer 112 shown includes a first refractive layer 112a and a second refractive layer 112b. The refractive layers 112a, 112b can be configured to increase and/or maximize an absorption of the laser radiation and/or reduce and/or minimize a reflection of the laser radiation. The first refractive layer 112a may have a higher index of refraction at a particular wavelength than the second refractive layer 112b. Accordingly, the first refractive layer 112a may have a higher refractive index while the second refractive layer 112b may have a lower refractive index. In some implementations, additional layers (e.g., more than two) in the refractive layer 112 are possible, which can alternate between high and low index materials.

Figure 3E:
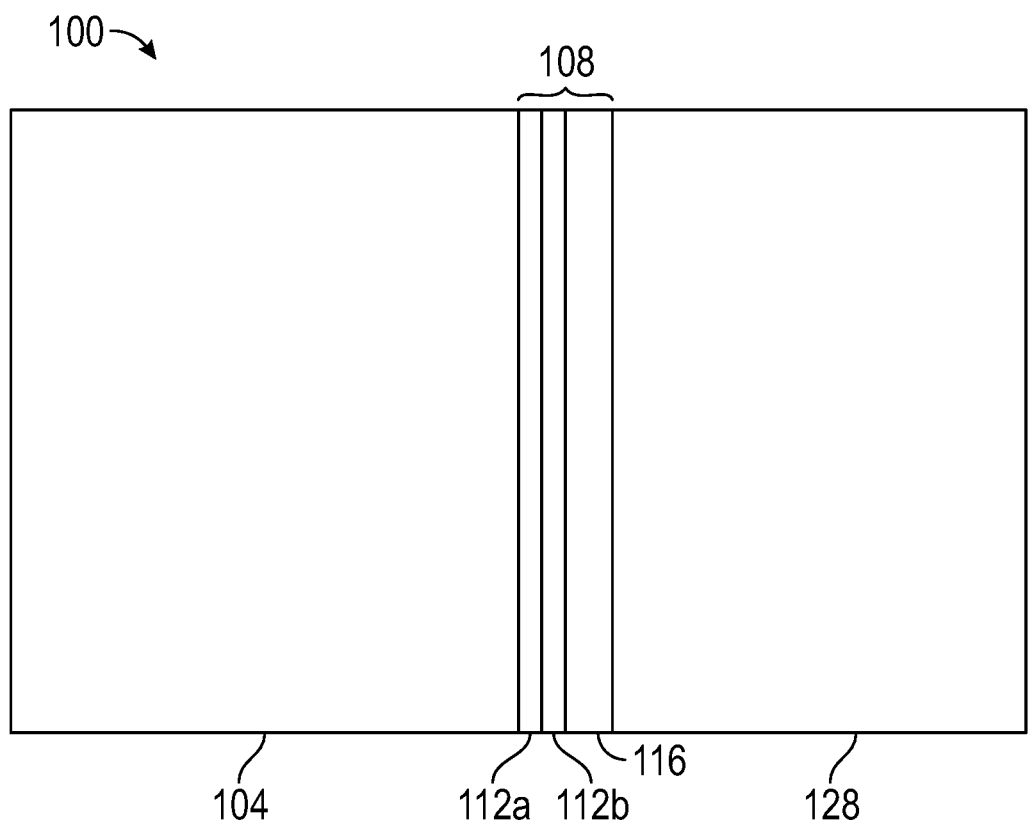
FIG. 3E shows an example optical structure of the one in FIG. 3D with a second substrate.

The laser reflectivity can be tuned using various aspects (e.g., width, material, etc.) of the refractive layers 112a, 112b. For example, it may be possible to adjust the high and low index films' individual thicknesses. This can result in a higher localized absorption that may include a reflectivity spectral minima. The absorption rates may be adjustable in the visible NIR wavelength region. FIG. 3E shows an example optical structure 100 of the one in FIG. 3D with a second substrate 128.

Figure 4:
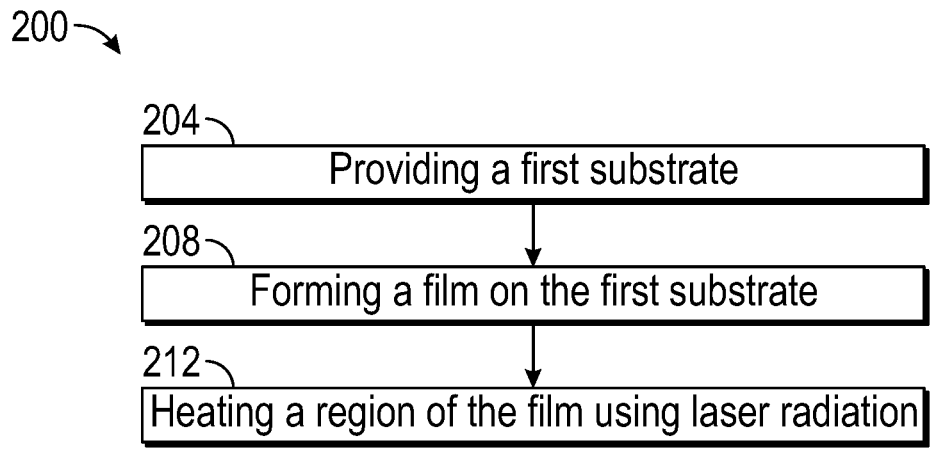
FIG. 4 shows an example method of laser bonding a multi-layer film to a substrate.

FIG. 4 shows an example method 200 of laser bonding a multi-layer film to a substrate. At block 204 the method can include providing a first substrate. At block 208 the method 200 includes forming a film on the first substrate. Forming a film on the first surface of the first substrate can include depositing at least a portion of the film under vacuum. For example, chemical vapor deposition or any other type of vacuum deposition may be used. The film can be formed to a thickness of less than 10 microns or any other thickness described herein. The film can include a plurality of layers. For example, as described herein, the film may include a reflective layer and/or a refractive layer. One or both of the layers can be comprised of individual layers. For example, the refractive layer can be made of a plurality of refractive layers. Each layer may have a different index of refraction and/or include a different material.

At block 212 the method 200 can include heating a region of the film (e.g., using laser radiation). The laser radiation may be emitted from a laser with an output energy of less than about 25 W, less than about 20 W, less than about 15 W, less than about 12 W, less than about 10 W, or any values therebetween, or any ranges bounded thereby. Heating the region of the film using laser radiation may include focusing laser light onto a region of the film. The laser may be continuous or pulsed, for example at a rate of greater than or equal to 1 kHz. Each pulse may have a width of between about 1 ns and 40 ns or any value therebetween. The method 200 may further include applying pressure between the first substrate and the film while heating the region of the film using laser radiation. The laser radiation may have a wavelength profile with a peak at 100 nm, 200 nm, 300 nm, 400 nm, 500 nm, 600 nm, 700 nm, 800 nm, 900 nm, 1000 nm, 2000 nm, 3000 nm, 4000 nm, 5000 nm, any value therebetween, or at a peak within a range formed by any value therein. The method may include causing an advancement of the region of the film heated by the laser at a rate of between about 1 mm/s and 1000 mm/s or any rate therebetween.

Figure 5:
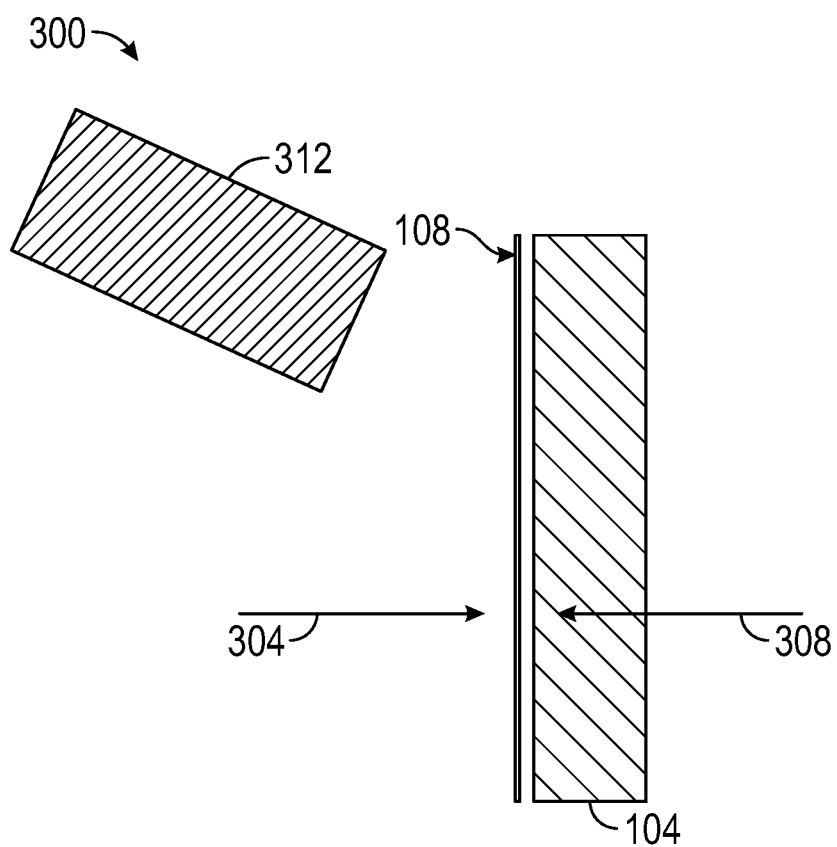
FIG. 5 shows an example thermal imaging setup that can be used to measure the temperature of the film.

A thermal imaging setup 300, schematically shown in FIG. 5, can be used to measure the temperature of the film 108 attached to the first substrate 104 (e.g., glass) during, for example, steady state exposure to the scanning laser beam. The laser radiation for the thermal imaging setup 300 can be projected along a first input beam 304 or a second input beam 308 since, as described herein, the laser radiation for the methods and/or optical structures described herein may be projected along one or more axes and/or from one or more source locations. A 630 nm laser as well as a loosely focused 500 mW laser were used. Results from the thermal camera 312 provide the following sample heating statistics: when the laser exposed the sample side coated with just Cr film, the surface temperature increased by 36° C., but when samples were exposed by the same laser beam from the side coated by both CrON and Cr, the temperature rise was 67° C. Based on absorptance data shown in FIG. 8, the difference in heating is expected to be about 1.75. The measured temperature rise difference was about 1.81.

Figure 6:
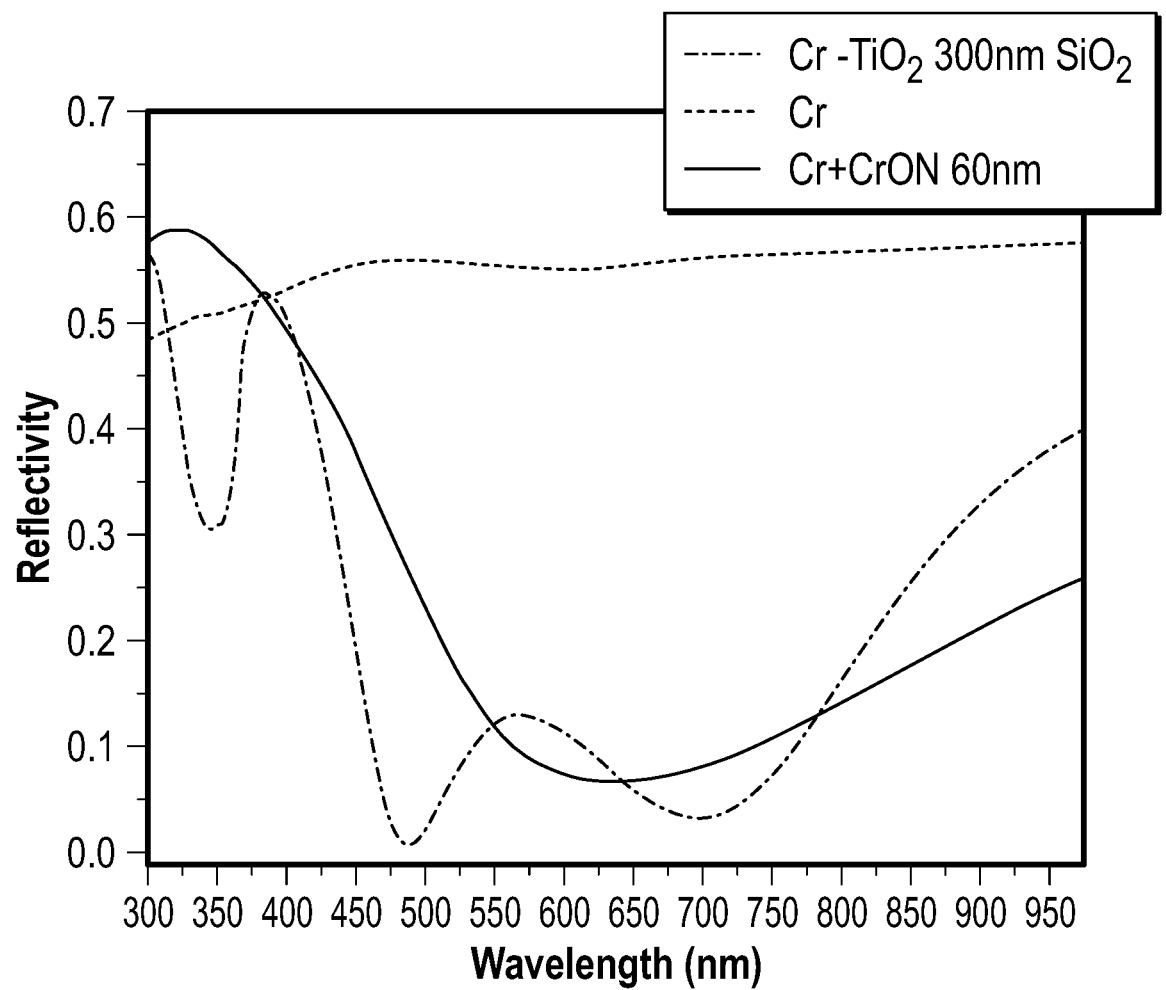
FIG. 6 shows the calculated reflectivity spectrum for three multi-layer structures.

FIG. 6 shows the calculated reflectivity spectrum for three multi-layer structures. The first was a 200-nm thick Cr film on a BK-7 glass substrate. The second was a 200-nm thick Cr film with a 60-nm thick high index CrON film, which has a refractive index (RI) of about 2.1 at 630 nm, on a BK-7 glass substrate. The third consisted of three films: a 200 nm Cr layer, a 70 nm $TiO_2$ (high RI) layer, and 300 nm $SiO_2$ layer on a BK-7 glass substrate. As can be seen in the plot of FIG. 6, reflectivity in the visible and near infrared wavelengths is significantly reduced by adding the additional layers to the Cr layer. In some implementations, a reflectivity of laser light at a particular wavelength (e.g., 520 nm, or other wavelengths disclosed herein) may be reduced by at least 5% from the laser irradiation of the film. In some implementations, the reduction of reflectivity at that wavelength may be greater than 10%, greater than 35%, greater than 40%, or greater than 50%. A treated area with greater reductions in reflectivity (e.g., greater than about 20%) due to the laser irradiation may be referred to as a "hard bond," in some cases. A treated area with smaller reductions in reflectivity (e.g., lower than about 20%) due to the laser irradiation may be referred to as a "soft bond," in some cases.

Figure 7:
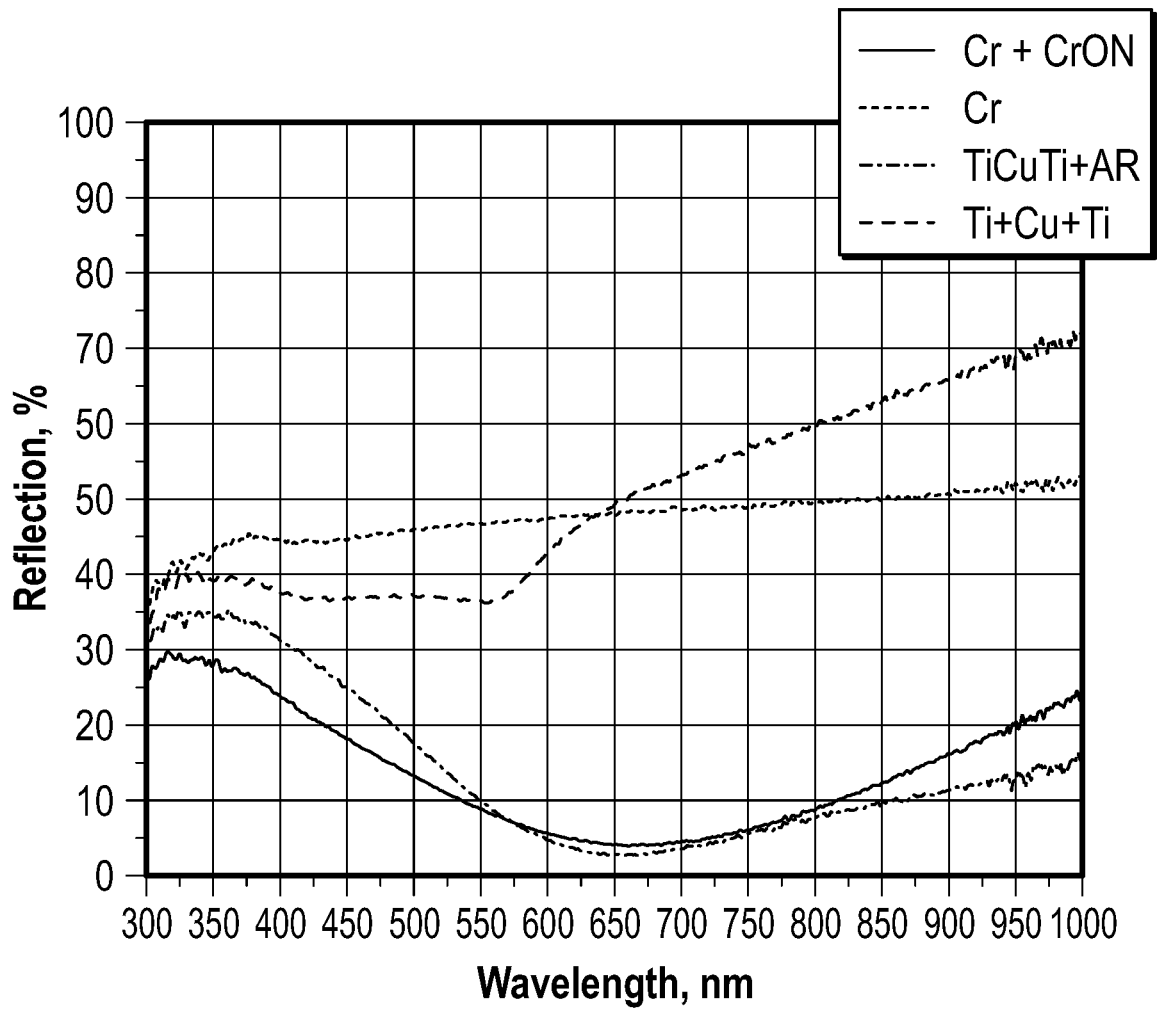
FIG. 7 shows measured reflectivity for various films.

FIG. 7 shows measured reflectivity for a reflective layer alone (Cr), a first multi-layer film (Cr—TiO2 thermal imaging setup 300 nm SiO2), and a second multi-layer film (Cr+CrON 60 nm). As shown, the multi-layer films have reflectivity minima in the visible and/or NIR spectrum. To test the values, films were exposed to a 355 nm laser, and an 810 nm laser. The laser tracks of the Cr layer show melting as visible in FIGS. 10A and 10B, which may be impacted by differences in the weld spot size (about 150 microns for 355 nm laser, and 250 microns for 810 nm laser), and difference in laser power (5 W vs. 11 W, for 355 nm and 810 nm laser respectively).

Various coatings can be used. For example, CrON films can be deposited on a BK-7 substrate that is coated with Cr (e.g., 200 nm) or Ti/Cu/Ti films. These films have typical reflectivity near about 50% in the visible and UV-through-NIR wavelength range. Addition of a high index dielectric film such as CrON can substantially reduce reflectivity in the visible and NIR wavelength range, and yet may vary modestly in the 350 nm UV region. Consequently, utilizing a 355 nm laser for the welding process may not be a preferable solution from a cost-benefit perspective while the economics of utilizing visible or NIR lasers can be.

Figure 8:
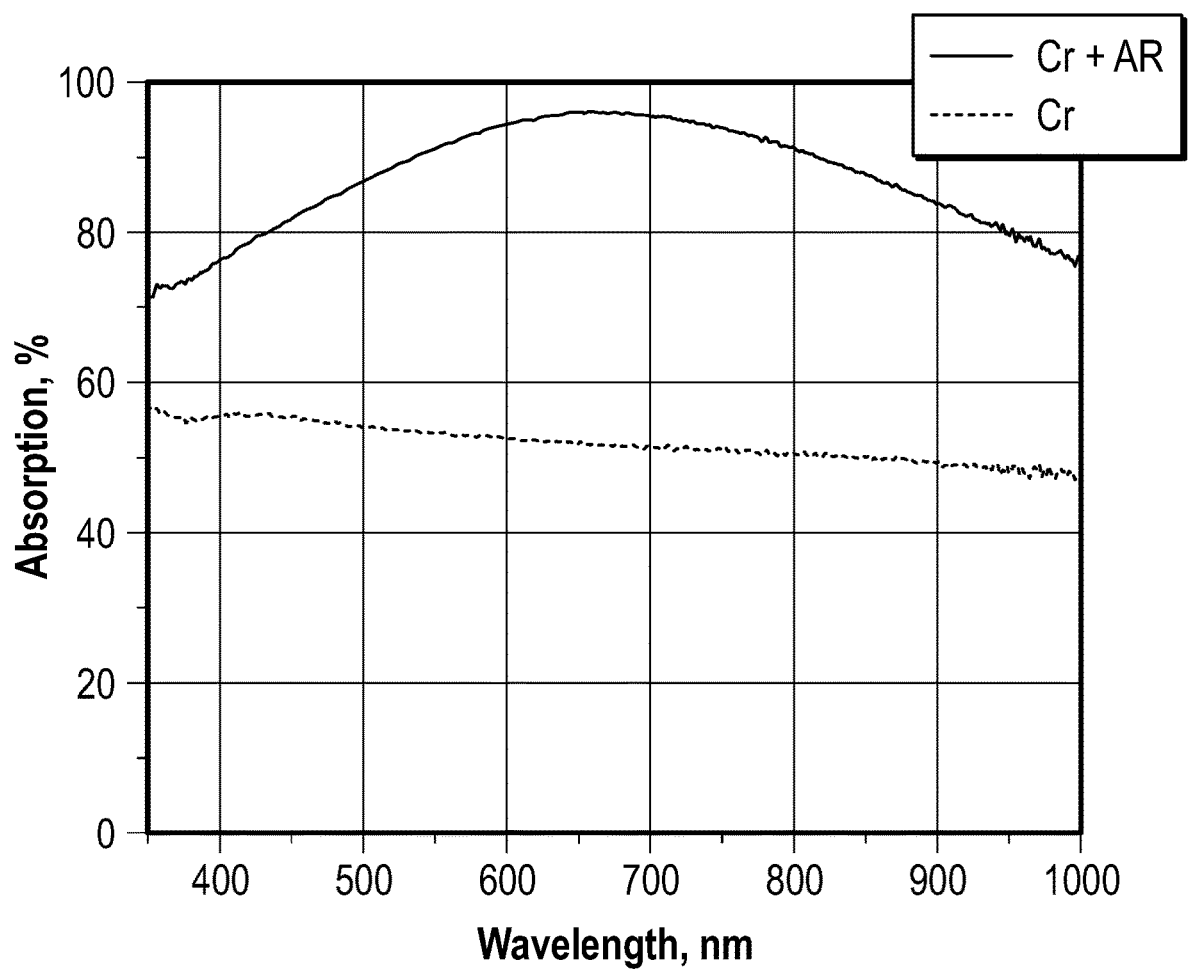
FIG. 8 shows calculated reflectivity rates of some films.
Figure 9:
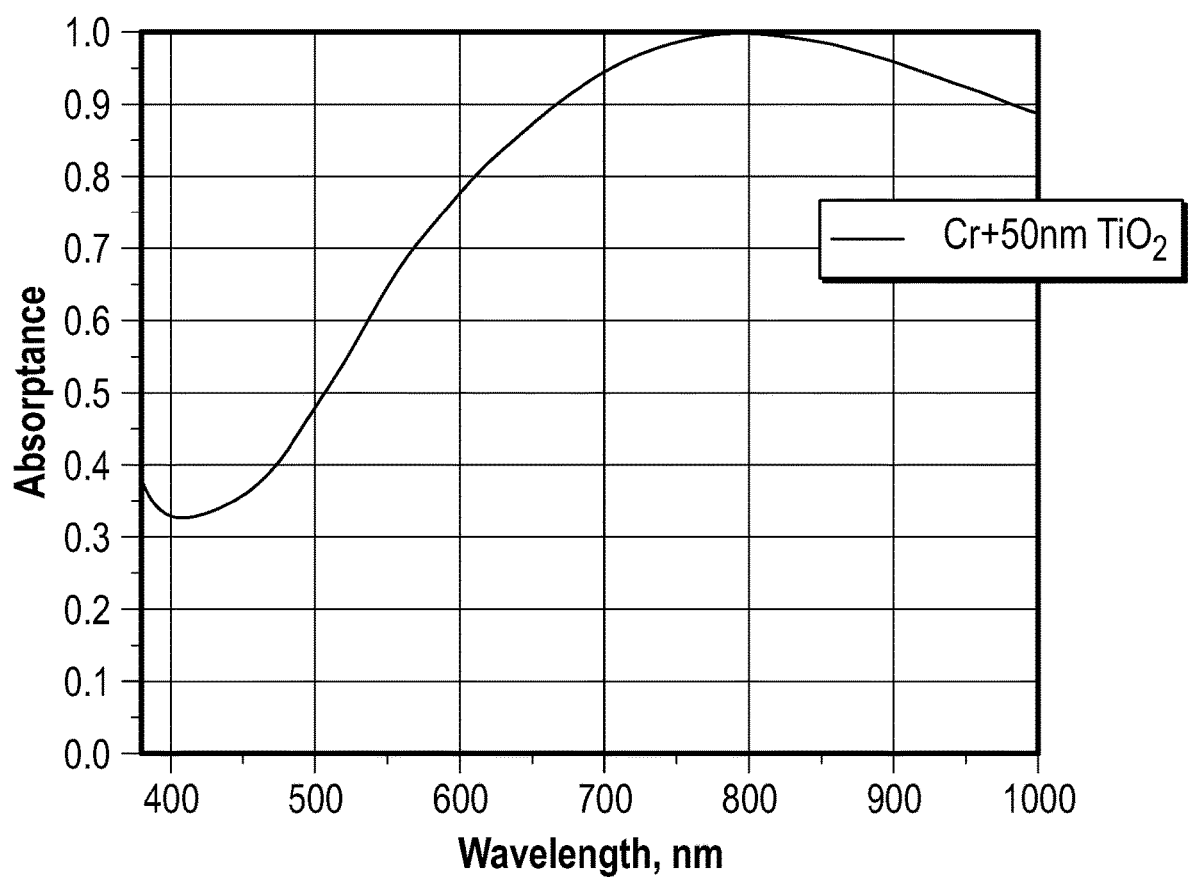
FIG. 9 shows a calculated absorption maximum of nearly 100% at a certain incident wavelength with proper film selection.

FIG. 8 shows calculated reflectivity rates of some films 108, but others are possible. A calculated absorption curve for a single-layer film (Cr) and an absorption curve for a multi-layer (Cr+AR coating) is shown. As shown, absorption rates close to 100% absorption at a target wavelength (e.g., in the visible or near infrared range) are possible. For example, a nearly 100% absorption maximum was achieved using an 810 nm incident wavelength with proper film selection, as shown in FIG. 9.

Figure 10A:
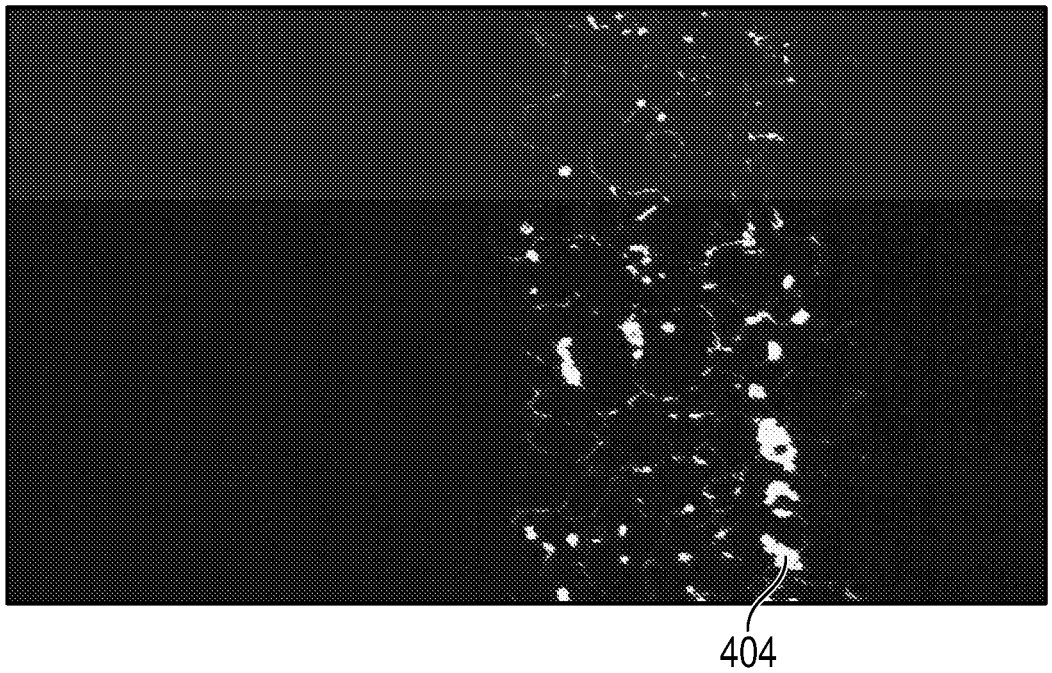
FIGS. 10A-10B show diffuse particles after a laser bond.
Figure 10B:
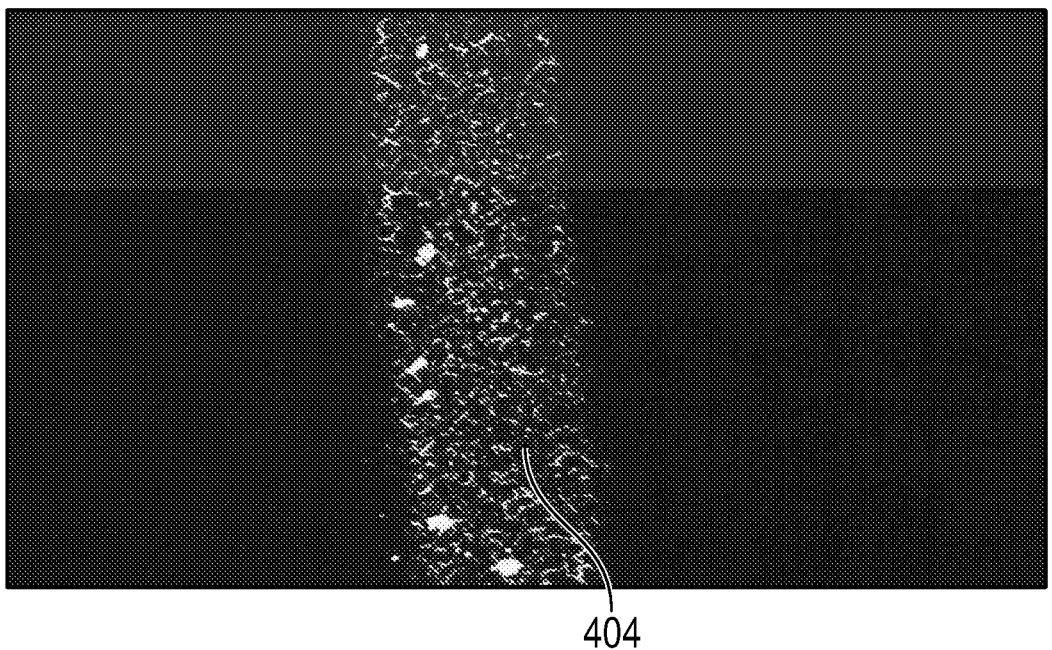

FIGS. 10A-10B show diffuse particles 404 after a laser bond. FIG. 10A shows a laser trace on Cr/CrON with a 810 nm laser. FIG. 10B shows a laser trace on the same film with a 355 nm laser. The proper weld may transform the original metal film into nanoparticles distributed throughout the glassy weld zone. The nanoparticles can be sufficiently small, resulting in transparent welds. Based on this, if one selectively coats only the weld zone with the metal film, the resulting proper weld can be transparent.

EXAMPLE IMPLEMENTATIONS

Various implementations are provided as examples below.

In a 1st example, a method of laser bonding a multi-layer film to a substrate includes: forming a film over a first surface of a first substrate that is transmissive to light at a first wavelength, wherein the film comprises: a reflective layer that is reflective to light at the first wavelength; and a refractive layer that is refractive to light at the first wavelength; and irradiating a region of the film using laser radiation passing through the first substrate, wherein a wavelength profile of the laser radiation has a peak at about the first wavelength; wherein the first wavelength is between about 300 nm and about 5000 nm.

In a 2nd example, the method of example 1, wherein the first substrate comprises glass or ceramic.

In a 3rd example, the method of any of examples 1 to 2, wherein the first substrate comprises silica or BK-7 glass.

In a 4th example, the method of any of examples 1 to 3, wherein forming a film on the first surface of the first substrate comprises depositing at least a portion of the film under vacuum.

In a 5th example, the method of any of examples 1 to 4, wherein the film has a thickness of less than 10 microns.

In a 6th example, the method of any of examples 1 to 5, wherein the reflective layer has a thickness of less than 1 micron.

In a 7th example, the method of any of examples 1 to 6, wherein the refractive layer has a thickness of less than 1 micron.

In a 8th example, the method of any of examples 1 to 7, wherein the film absorbs a greater proportion of laser radiation than the reflective layer alone at the first wavelength.

In a 9th example, the method of any of examples 1 to 8, wherein the reflective layer comprises a material selected from the group consisting essentially of $SnO_2$, ZnO, TiO, ITO, Zn, Ti, Ce, Pb, Fe, Va, Cr, Cu, Mn, Mg, Ge, $SnF_2$, $ZnF_2$, or a combination thereof.

In a 10th example, the method of any of examples 1 to 9, wherein the refractive layer, in combination with the reflective layer, reduces reflection of laser radiation at the first wavelength relative to the reflective layer alone.

In a 11th example, the method of any of examples 1 to 10, wherein the refractive layer has an index of refraction of greater than 1.2 at the first wavelength.

In a 12th example, the method of any of examples 1 to 11, wherein the film absorbs more than 60% of the laser radiation at the first wavelength.

In a 13th example, the method of any of examples 1 to 12, wherein the film reflects less than 30% of the laser radiation at the first wavelength.

In a 14th example, the method of any of examples 1 to 13, wherein the film absorbs more than 90% of the laser radiation at the first wavelength.

In a 15th example, the method of any of examples 1 to 14, wherein a rate of temperature increase in the film caused by the laser radiation at the first wavelength is greater than 50% relative to the reflective layer alone.

In a 16th example, the method of any of examples 1 to 15, wherein the laser radiation is emitted from a laser having an output power of less than 15 W.

In a 17th example, the method of any of examples 1 to 16, wherein the region of the film irradiated by the laser radiation has a width of less than 1 mm.

In an 18th example, the method of any of examples 1 to 17, wherein irradiating the region of the film using laser radiation comprises focusing laser light onto the region of the film.

In a 19th example, the method of any of examples 1 to 18, irradiating the region of the film using laser radiation comprises pulsing a laser at a rate of greater than or equal to 1 kHz.

In a 20th example, the method of any of examples 1 to 19, irradiating the region of the film using laser radiation comprises pulsing a laser, each pulse having a width of between about 1 ns and 40 ns.

In a 21st example, the method of any of examples 1 to 20, wherein the refractive layer comprises a first layer and a second layer.

In a 22nd example, the method of example 21, wherein the first layer has a higher index of refraction at the first wavelength than the second layer.

In a 23rd example, the method of any of examples 21 to 22, wherein the first layer of the refractive layer is disposed between the reflective layer and the second layer of the refractive layer.

In a 24th example, the method of any of examples 21 to 23, wherein the first layer of the refractive layer has a thickness greater than a thickness of the second layer of the refractive layer.

In a 25th example, the method of any of examples 21 to 24, wherein the first layer of the refractive layer has a thickness of less than 500 nm.

In a 26th example, the method of any of examples 21 to 25, wherein the second layer of the refractive layer has a thickness of less than 1 micron.

In a 27th example, the method of any of examples 1 to 26, wherein the reflective layer of the film is disposed between the first substrate and the refractive layer of the film.

In a 28th example, the method of any of examples 1 to 27, further comprising providing a second substrate.

In a 29th example, the method of example 28, wherein the second substrate comprises ceramic, glass, or metal.

In a 30th example, the method of any of examples 28 to 29, wherein the second substrate reflects light at the first wavelength.

In a 31st example, the method of any of examples 28 to 29, wherein the second substrate absorbs light at the first wavelength.

In a 32nd example, the method of any of examples 28 to 29, wherein the second substrate transmits light at the first wavelength.

In a 33rd example, the method of any of examples 28 to 32, wherein the film is disposed between the first substrate and the second substrate.

In a 34th example, the method of any of examples 28 to 33, wherein a thickness of the first substrate is different from a thickness of the second substrate.

In a 35th example, the method of any of examples 28 to 34, wherein a thickness of the first substrate is greater than a thickness of the second substrate.

In a 36th example, the method of any of examples 1 to 35, wherein the film comprises a layer of glass frit.

In a 37th example, the method of any of examples 1 to 36, further comprising applying pressure between the first substrate and the film while irradiating the region of the film using laser radiation.

In a 38th example, the method of any of examples 1 to 37, wherein the first wavelength is in a near infrared light range.

In a 39th example, the method of any of examples 1 to 37, wherein the first wavelength is between about 420 nm and 780 nm.

In a 40th example, the method of any of examples 1 to 37, wherein the first wavelength is between about 780 nm and 5000 nm.

In a 41st example, the method of any of examples 1 to 40, further comprising causing an advancement of the region of the film irradiated by the laser at a rate of between about 1 mm/s and 1000 mm/s.

In a 42nd example, the method of any of examples 1 to 41, wherein the film comprises a dielectric.

In a 43rd example, the method of any of examples 1 to 42, wherein irradiating the region of the film using laser radiation comprises using continuous wave emission.

In a 44th example, the method of any of examples 1 to 43, wherein irradiating the region of the film using laser radiation comprises reducing a reflectivity of the reflective layer by at least 5%.

In a 45th example, a bonded structure formed by the method of any of examples 1 to 44.

In a 46th example, a bonded structure includes: a first material that transmits light at a first wavelength, wherein the first material has a first end, a second end, and a thickness measured between the first and second ends; and nanoparticles dispersed within a region of the first material near a second end of the first material, the nanoparticles comprising: first particles of a material that reflects light at the first wavelength (e.g., first particles resulting from a reflective layer); and second particles of a material that refracts light at the first wavelength (e.g., second particles resulting from a refractive layer).

In a 47th example, the bonded structure of example 46, wherein the region of the first material near a second end is disposed from the second end by no more than 5% of the thickness of the first material.

In a 48th example, the bonded structure of any of examples 46 to 47, wherein the first material comprises glass or ceramic.

In a 49th example, the bonded structure of any of examples 46 to 48, wherein the first material comprises silica or BK-7 glass.

In a 50th example, the bonded structure of any of examples 46 to 49, wherein the first (e.g., reflective) particles comprise particles selected from the group consisting essentially of $SnO_2$, ZnO, TiO, ITO, Zn, Ti, Ce, Pb, Fe, Va, Cr, Cu, Mn, Mg, Ge, $SnF_2$, $ZnF_2$, or a combination thereof.

In a 51st example, the bonded structure of any of examples 46 to 50, wherein the second (e.g., refractive) particles have an index of refraction of greater than 1.2 at the first wavelength.

In a 52nd example, the bonded structure of any of examples 46 to 51, wherein the nanoparticles comprise additional particles of another material that refracts light at the first wavelength.

In a 53rd example, the bonded structure of example 52, wherein the second particles have a higher index of refraction at the first wavelength than the additional particles.

In a 54th example, the bonded structure of any of examples 52 to 53, wherein the second particles (e.g., of the refractive layer) are disposed between the first (e.g., reflective) particles and the additional particles.

In a 55th example, the bonded structure of any of examples 46 to 54, wherein the first (e.g., reflective) particles are generally disposed farther from the first end than the second (e.g., refractive) particles are.

In a 56th example, the bonded structure of any of examples 46 to 55, further comprising a second material.

In a 57th example, the bonded structure of example 56, wherein the second material comprises ceramic, glass, or metal.

In a 58th example, the bonded structure of any of examples 56 to 57, wherein the second material reflects light at the first wavelength (e.g., the second particles and the second material can be made of the same material).

In a 59th example, the bonded structure of any of examples 56 to 58, wherein the second material absorbs light at the first wavelength.

In a 60th example, the bonded structure of any of examples 56 to 59, wherein the second material transmits light at the first wavelength.

In a 61st example, the bonded structure of any of examples 56 to 60, wherein the nanoparticles are generally disposed between the first material and the second material.

In a 62nd example, the bonded structure of any of examples 56 to 61, wherein a thickness of the first material is different from a thickness of the second material.

In a 63rd example, the bonded structure of any of examples 56 to 62, wherein a thickness of the first material is greater than a thickness of the second material.

In a 64th example, the bonded structure of any of examples 56 to 63, further comprising a layer of glass frit.

In a 65th example, the bonded structure of any of examples 56 to 64, wherein the first material is bonded to the second material.

In a 66th example, the bonded structure of any of examples 46 to 65, wherein the first wavelength is in a near infrared light range.

In a 67th example, the bonded structure of any of examples 46 to 65, wherein the first wavelength is between about 420 nm and 780 nm.

In a 68th example, the bonded structure of any of examples 46 to 65, wherein the first wavelength is between about 780 nm and 5000 nm.

In a 69th example, the bonded structure of any of examples 46 to 68, wherein the nanoparticles comprise particles of a dielectric.

In a 70th example, the bonded structure of any of examples 46 to 69, wherein the bonded structure is substantially transparent in portions where the nanoparticles are dispersed.

In a 71st example, the bonded structure of any of examples 46 to 70, wherein the region of the first (e.g., optically transmissive) material comprises: a first region having a ratio of a number of the first (e.g., reflective) particles to a number of the second (e.g., refractive) particles of greater than one; and a second region having a ratio of a number of the second (e.g., refractive) particles to a number of the first (e.g., reflective) particles of greater than one. In some cases, the first region can be closer to the second end of the first material, and/or the second region can be closer to the first end of the first material.

Additional Details

In the disclosure provided above, apparatus, systems, and methods for control of a lens are described in connection with particular example implementations. It will be understood, however, that the principles and advantages of the implementations can be used for any other applicable systems, apparatus, or methods. While some of the disclosed implementations may be described with reference to analog, digital, or mixed circuitry, in different implementations, the principles and advantages discussed herein can be implemented for different parts as analog, digital, or mixed circuitry.

The principles and advantages described herein can be implemented in various apparatuses. Examples of such apparatuses can include, but are not limited to, consumer electronic products, parts of the consumer electronic products, electronic test equipment, etc. The principles and advantages described herein relate to lenses. Examples products with lenses can include a mobile phone (for example, a smart phone), healthcare monitoring devices, vehicular electronics systems such as automotive electronics systems, webcams, a television, a computer monitor, a computer, a hand-held computer, a tablet computer, a laptop computer, a personal digital assistant (PDA), a refrigerator, a DVD player, a CD player, a digital video recorder (DVR), a camcorder, a camera, a digital camera, a copier, a facsimile machine, a scanner, a multi-functional peripheral device, a wrist watch, a clock, etc. Further, apparatuses can include unfinished products.

In some implementations, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The processor(s) and/or controller(s) described herein can be coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other implementations, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The processor(s) and/or controller(s) described herein may implement the techniques described herein using customized hard-wired logic, one or more ASICs or FPGAs, firmware and/or program logic which causes microprocessors and/or controllers to be a special-purpose machine. According to one implementation, parts of the techniques disclosed herein are performed by a processor (e.g., a microprocessor) and/or other controller elements in response to executing one or more sequences instructions contained in a memory. Such instructions may be read into the memory from another storage medium, such as storage device. Execution of the sequences of instructions contained in the memory causes the processor or controller to perform the process steps described herein. In alternative implementations, hard-wired circuitry may be used in place of or in combination with software instructions.

Moreover, the various illustrative logical blocks and modules described in connection with the implementations disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another implementation, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values (e.g., within a range of measurement error).

Although this disclosure contains certain implementations and examples, it will be understood by those skilled in the art that the scope extends beyond the specifically disclosed implementations to other alternative implementations and/or uses and obvious modifications and equivalents thereof. In addition, while several variations of the implementations have been shown and described in detail, other modifications will be readily apparent to those of skill in the art based upon this disclosure. It is also contemplated that various combinations or sub-combinations of the specific features and aspects of the implementations may be made and still fall within the scope of this disclosure. It should be understood that various features and aspects of the disclosed implementations can be combined with, or substituted for, one another in order to form varying modes of the implementations. Any methods disclosed herein need not be performed in the order recited. Thus, it is intended that the scope should not be limited by the particular implementations described above.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described. Further, the disclosure herein of any particular feature, aspect, method, property, characteristic, quality, attribute, element, or the like in connection with an implementation or implementation can be used in all other implementations or implementations set forth herein. Any methods disclosed herein need not be performed in the order recited. The methods disclosed herein may include certain actions taken by a practitioner;

however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±1%, ±3%, ±5%, ±10%, ±15%, etc.). For example, "about 3.5 mm" includes "3.5 mm." Recitation of numbers and/or values herein should be understood to disclose both the values or numbers as well as "about" or "approximately" those values or numbers, even where the terms "about" or "approximately" are not recited. For example, recitation of "3.5 mm" includes "about 3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A method of laser bonding a multi-layer film to a substrate, the method comprising:
    forming a film over a first surface of a first substrate that is transmissive to light at a first wavelength, wherein the film comprises:
        a reflective layer that is reflective to light at the first wavelength; and
        a refractive layer that is refractive to light at the first wavelength; and
    irradiating a region of the film using laser radiation passing through the first substrate, wherein a wavelength profile of the laser radiation has a peak at about the first wavelength, and the refractive layer, in combination with the reflective layer, reduces reflection of the laser radiation at the first wavelength relative to the reflective layer alone;
    wherein the first wavelength is between about 300 nm and about 5000 nm,
    wherein the refractive layer comprises a first layer and a second layer,
    wherein the first layer has a higher index of refraction at the first wavelength than the second layer, and
    wherein the first layer of the refractive layer is disposed between the reflective layer and the second layer of the refractive layer.

2. The method of claim 1, wherein the film has a thickness of less than 10 microns.

3. The method of claim 1, wherein the reflective layer has a thickness of less than 1 micron.

4. The method of claim 1, wherein the reflective layer comprises a material selected from the group consisting essentially of $SnO_2$, ZnO, TiO, ITO, Zn, Ti, Ce, Pb, Fe, Va, Cr, Cu, Mn, Mg, Ge, $SnF_2$, $ZnF_2$, or a combination thereof.

5. The method of claim 1, wherein the refractive layer has an index of refraction of greater than 1.2 at the first wavelength.

6. The method of claim 1, wherein irradiating the region of the film using laser radiation comprises pulsing a laser at a rate of greater than or equal to 1 kHz.

7. The method of claim 1, wherein irradiating the region of the film using laser radiation comprises pulsing a laser, each pulse having a width of between about 1 ns and 40 ns.

8. The method of claim 1, wherein the film is disposed between the first substrate and a second substrate.

9. The method of claim 1, wherein irradiating the region of the film using laser radiation comprises using continuous wave emission.

10. The method of claim 1, wherein irradiating the region of the film using laser radiation comprises reducing a reflectivity of the reflective layer by at least 5%.

11. The method of claim 1, wherein the film absorbs more than 60% and reflects less than 30% of the laser radiation at the first wavelength.

12. The method of claim 1, wherein the film absorbs a greater proportion of the laser radiation than the reflective layer alone at the first wavelength.

13. A method of forming a multi-layer film on a substrate, the method comprising:
    forming a film over a first surface of a first substrate that is transmissive to light at a first wavelength, wherein the film comprises:
        a reflective layer that is reflective to light at the first wavelength; and
        a refractive layer that is refractive to light at the first wavelength;
    wherein, upon irradiating a region of the film through the first substrate with laser radiation having a wavelength profile with a peak at about the first wavelength, the refractive layer, in combination with the reflective layer, reduces reflection of the laser radiation at the first wavelength relative to the reflective layer alone
    wherein the refractive layer comprises a first layer and a second layer,
    wherein the first layer has a higher index of refraction at the first wavelength than the second layer, and
    wherein the first layer of the refractive layer is disposed between the reflective layer and the second layer of the refractive layer.

14. The method of claim 13, wherein the film has a thickness of less than 10 microns.

15. A method of laser bonding a multi-layer film to a substrate, the method comprising:
    irradiating a region of a film over a first surface of a first substrate that is transmissive to light at a first wavelength using laser radiation passing through the first substrate,
    wherein the film comprises:
        a reflective layer that is reflective to light at the first wavelength; and
        a refractive layer that is refractive to light at the first wavelength;
    wherein a wavelength profile of the laser radiation has a peak at about the first wavelength, and the refractive layer, in combination with the reflective layer, reduces reflection of the laser radiation at the first wavelength relative to the reflective layer alone;
    wherein the first wavelength is between about 300 nm and about 5000 nm,
    wherein the refractive layer comprises a first layer and a second layer,
    wherein the first layer has a higher index of refraction at the first wavelength than the second layer, and
    wherein the first layer of the refractive layer is disposed between the reflective layer and the second layer of the refractive layer.

16. The method of claim 15, wherein irradiating the region of the film using laser radiation comprises pulsing a laser at a rate of greater than or equal to 1 kHz.

17. The method claim 15, wherein irradiating the region of the film using laser radiation comprises pulsing a laser, each pulse having a width of between about 1 ns and 40 ns.

* * * * *